United States Patent
Vanderberg

(10) Patent No.: US 9,022,395 B1
(45) Date of Patent: May 5, 2015

(54) COOLER HAVING REMOVABLE WHEEL ASSEMBLY

(75) Inventor: Matthew Alexander Vanderberg, Charlotte, NC (US)

(73) Assignee: M & C Innovations, LLC, Charlotte, NC (US)

( * ) Notice: Subject to any disclaimer, the term of this patent is extended or adjusted under 35 U.S.C. 154(b) by 95 days.

(21) Appl. No.: 13/526,485

(22) Filed: Jun. 18, 2012

Related U.S. Application Data

(60) Provisional application No. 61/498,310, filed on Jun. 17, 2011.

(51) Int. Cl.
  *B62B 1/10*  (2006.01)
  *B62B 1/20*  (2006.01)
  *B62B 11/00*  (2006.01)
  *F25D 3/08*  (2006.01)

(52) U.S. Cl.
  CPC ........................................ *F25D 3/08* (2013.01)

(58) Field of Classification Search
  USPC ............. 280/47.17, 47.24, 47.26, 47.34, 638, 280/35, 655.1, 47.131, 47.18, 47.371, 280/79.11, 79.2
  See application file for complete search history.

(56) References Cited

U.S. PATENT DOCUMENTS

| | | | |
|---|---|---|---|
| 3,191,793 A | | 6/1965 | Morrison |
| 3,347,060 A | * | 10/1967 | Barkan ........................ 62/457.9 |
| 3,743,130 A | | 7/1973 | Jorgensen |
| 3,842,953 A | * | 10/1974 | Royet ........................ 190/18 A |
| 3,960,252 A | * | 6/1976 | Cassimally ................. 190/18 A |
| 4,044,867 A | * | 8/1977 | Fisher ........................... 190/107 |
| 4,085,785 A | * | 4/1978 | Hoot ........................ 220/592.24 |
| 4,157,103 A | * | 6/1979 | La Fleur ......................... 141/98 |
| 4,612,781 A | | 9/1986 | Swerdon |
| 4,846,493 A | * | 7/1989 | Mason .......................... 280/641 |
| 4,900,043 A | * | 2/1990 | Kho ............................... 280/37 |
| 5,169,164 A | * | 12/1992 | Bradford ........................ 280/35 |

(Continued)

FOREIGN PATENT DOCUMENTS

| | | | | |
|---|---|---|---|---|
| WO | WO 2007063330 A2 | * | 6/2007 | ............. A63B 55/08 |
| WO | US2007/009689 A1 | | 8/2007 | |

OTHER PUBLICATIONS

Information Disclosure Statement (IDS) Letter, 15 pages (including photographsin Exhibit), submitted by Applicant on Mar. 4, 2013.

*Primary Examiner* — J. Allen Shriver, II
*Assistant Examiner* — Travis Coolman
(74) *Attorney, Agent, or Firm* — Tillman Wright, PLLC; Chad D. Tillman; Jeremy C. Doerre

(57) ABSTRACT

A cooler comprises a main body which includes a base, an upper rim, and one or more cooler walls extending therebetween. The cooler further comprises a removable wheel assembly which includes two coaxial wheels, and an axle. The two coaxial wheels are removably securable to the axle. The cooler still further comprises a wheel fastening system configured to secure the removable wheel assembly to the base of the main body which includes a mount, a clip hingedly connected to the mount, and a locking clasp configured to lock the clip into a closed position to secure the wheel assembly. The cooler yet further comprises a lid including two wheel storage recesses, each being sized and dimensioned to receive and retain one of the coaxial wheel of the wheel assembly, and an axle storage recess sized and dimensioned to receive and retain the axle of the wheel assembly.

14 Claims, 15 Drawing Sheets

(56) References Cited

U.S. PATENT DOCUMENTS

| | | | |
|---|---|---|---|
| 5,228,706 A | 7/1993 | Boville | |
| 5,249,438 A * | 10/1993 | Rhaney et al. | 62/457.7 |
| 5,285,656 A | 2/1994 | Peters | |
| 5,313,817 A | 5/1994 | Meinders | |
| 5,373,708 A * | 12/1994 | Dumoulin, Jr. | 62/457.7 |
| 5,407,218 A * | 4/1995 | Jackson | 280/30 |
| 5,423,195 A | 6/1995 | Peters | |
| 5,465,985 A * | 11/1995 | Devan et al. | 280/30 |
| 5,480,170 A | 1/1996 | Kaiser | |
| 5,489,107 A * | 2/1996 | Kho | 280/47.131 |
| 5,803,472 A | 9/1998 | Lien | |
| 5,857,695 A * | 1/1999 | Crowell | 280/651 |
| 5,913,448 A | 6/1999 | Mann | |
| 5,988,658 A * | 11/1999 | Ritchie et al. | 280/47.26 |
| 6,145,856 A * | 11/2000 | Conti | 280/47.26 |
| 6,176,499 B1 * | 1/2001 | Conrado et al. | 280/47.26 |
| 6,193,247 B1 * | 2/2001 | Spear et al. | 280/33.998 |
| 6,364,329 B1 * | 4/2002 | Holub et al. | 280/47.26 |
| 6,446,988 B1 * | 9/2002 | Kho | 280/47.26 |
| 6,755,428 B2 * | 6/2004 | Butler | 280/47.26 |
| 6,769,702 B2 * | 8/2004 | Young | 280/47.26 |
| D550,036 S | 9/2007 | Holcomb | |
| 7,290,775 B2 * | 11/2007 | Parker et al. | 280/47.26 |
| 7,306,243 B2 * | 12/2007 | Van Horn et al. | 280/30 |
| 7,584,972 B2 * | 9/2009 | Myers et al. | 280/47.17 |
| 7,677,580 B2 | 3/2010 | Vanderberg et al. | |
| 7,857,327 B2 * | 12/2010 | Reed | 280/30 |
| 8,317,046 B2 * | 11/2012 | Vanderberg et al. | 220/6 |
| 2002/0095947 A1 * | 7/2002 | Treppedi et al. | 62/457.9 |
| 2005/0127073 A1 | 6/2005 | Kusuma | |
| 2006/0096929 A1 | 5/2006 | Repp | |
| 2006/0237927 A1 | 10/2006 | Vanderberg | |
| 2007/0023439 A1 | 2/2007 | Vaughn | |
| 2007/0251874 A1 | 11/2007 | Stewart | |
| 2010/0000893 A1 | 1/2010 | Twig | |
| 2011/0197625 A1 | 8/2011 | Urban | |

* cited by examiner

10

10

COOLER HAVING REMOVABLE WHEEL ASSEMBLY

CROSS-REFERENCE TO RELATED APPLICATION

The present application is a nonprovisional of, and claims priority under 35 U.S.C. §119(e) to, U.S. provisional patent application Ser. No. 61/498,310, filed Jun. 17, 2011, which is hereby incorporated herein by reference. Additionally, the present application hereby incorporates by reference each of the following U.S. patents and U.S. patent application publications: U.S. Pat. No. 7,677,580; U.S. Pat. No. 7,387,305; U.S. Pat. No. 7,559,559; U.S. Pat. No. 7,543,828; U.S. Pat. No. 7,549,653; U.S. Pat. No. 7,458,589; U.S. Pat. No. 7,458,590; U.S. Pat. No. 7,458,591; U.S. Pat. No. 7,513,510; U.S. Pat. No. 7,677,581; US 2006/0237923 A1; US 2006/0237924 A1; US 2006/0237925 A1; US 2006/0237926 A1; US 2006/0237927 A1; US 2006/0237928 A1; US 2008/0223071 A1; US 2008/0223862 A1; US 2008/0223072 A1; US 2009/0019882 A1; US 2010/0154464 A1; US 2010/0147015; US 2011/0042390 A1; US 2011/0042391 A1; US 2011/0042392 A1; US 2011/0042393 A1; US 2011/0042394 A1; US 2011/0042395 A1; US 2011/0042396 A1; US 2011/0042397 A1; and US 2011/0042398 A1. Each of these patents and application publications is incorporated herein by reference for purposes of disclosing aspects, features, and embodiments that, when combined with one or more aspects or features of the present invention as disclosed below, constitute embodiments of the present invention. Thus the present invention, inter alia, comprises enhancements, improvements, and alterations of the embodiments of the incorporated references.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to portable coolers. Portable coolers are commonly used to transport chilled items, or to keep items chilled at a location. However, portable coolers, when loaded, can be very heavy, and thus difficult to transport. Some known portable coolers utilize wheels to facilitate transport.

A need exists for improvement in wheeled portable coolers. This, and other needs, are addressed by one or more aspects of the present invention.

SUMMARY OF THE INVENTION

The present invention includes many aspects and features. Moreover, while many aspects and features relate to, and are described in, certain contexts, the present invention is not limited to use only in such contexts, as will become apparent from the following summaries and detailed descriptions of aspects, features, and one or more embodiments of the present invention.

Accordingly, one aspect of the present invention relates to a cooler. The cooler includes a main body, a removable wheel assembly, and a wheel fastening system configured to secure the removable wheel assembly to a base of the main body.

In a feature of this aspect, the cooler further includes a lid, and the lid is configured to receive and retain the removable wheel assembly for storage when it is not secured to a base of the main body.

Another aspect of the present invention relates to a cooler. The cooler includes a main body including a base, an upper rim, and one or more cooler walls extending therebetween; a removable wheel assembly; and a wheel fastening system configured to secure the removable wheel assembly to the base of the main body.

In a feature of this aspect, the removable wheel assembly includes two coaxial wheels, and an axle. In some implementations, the axle includes two recessed portions adapted to align with a clip of the wheel fastening system when the removable wheel assembly is secured to the main body by the wheel fastening system. In some implementations, the base includes a u-shaped channel sized and dimensioned to correspond to an axle of the removable wheel assembly.

In a feature of this aspect, the wheel fastening system includes a mount, a clip hingedly connected to the mount, and a locking clasp configured to lock the clip into a closed position to secure the wheel assembly.

In a feature of this aspect, wherein the cooler further includes a lid. In some implementations, the lid includes one or more recesses configured to receive components of the wheel assembly. In some implementations, the lid includes one or more recesses configured to receive and retain components of the wheel assembly. In some implementations, the lid includes two wheel storage recesses, each being configured to receive and retain a wheel of the wheel assembly, and an axle storage recess configured to receive and retain an axle of the wheel assembly.

In another feature of this aspect, the cooler includes a handle. In some implementations, the handle is telescoping. In some implementations, the handle is removably attachable to the base. In at least one variation, the cooler includes a lid having a handle storage recess for storage of the handle. In some implementations, the handle is telescoping and removably attachable to the base.

Another aspect of the present invention relates to a cooler. The cooler includes a main body including a base, an upper rim, and one or more cooler walls extending therebetween; a removable wheel assembly which includes two coaxial wheels, and an axle. The two coaxial wheels are removably securable to the axle. The cooler further includes a wheel fastening system configured to secure the removable wheel assembly to the base of the main body, the wheel fastening system including a mount, a clip hingedly connected to the mount, and a locking clasp configured to lock the clip into a closed position to secure the wheel assembly. The cooler still further comprises a lid which includes two wheel storage recesses, each being sized and dimensioned to receive and retain one of the coaxial wheel of the wheel assembly, and an axle storage recess sized and dimensioned to receive and retain the axle of the wheel assembly.

Another aspect of the present invention relates to a cooler as disclosed.

Another aspect of the present invention relates to a method of removing wheels from a cooler as disclosed.

Another aspect of the present invention relates to a method of securing wheels to a cooler as disclosed.

Another aspect of the present invention relates to a method of removing wheels from a cooler and storing them using recesses in a lid of the cooler as disclosed.

Another aspect of the present invention relates to a method as disclosed.

Another aspect of the present invention relates to a system as disclosed.

Another aspect of the present invention relates to an apparatus as disclosed.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
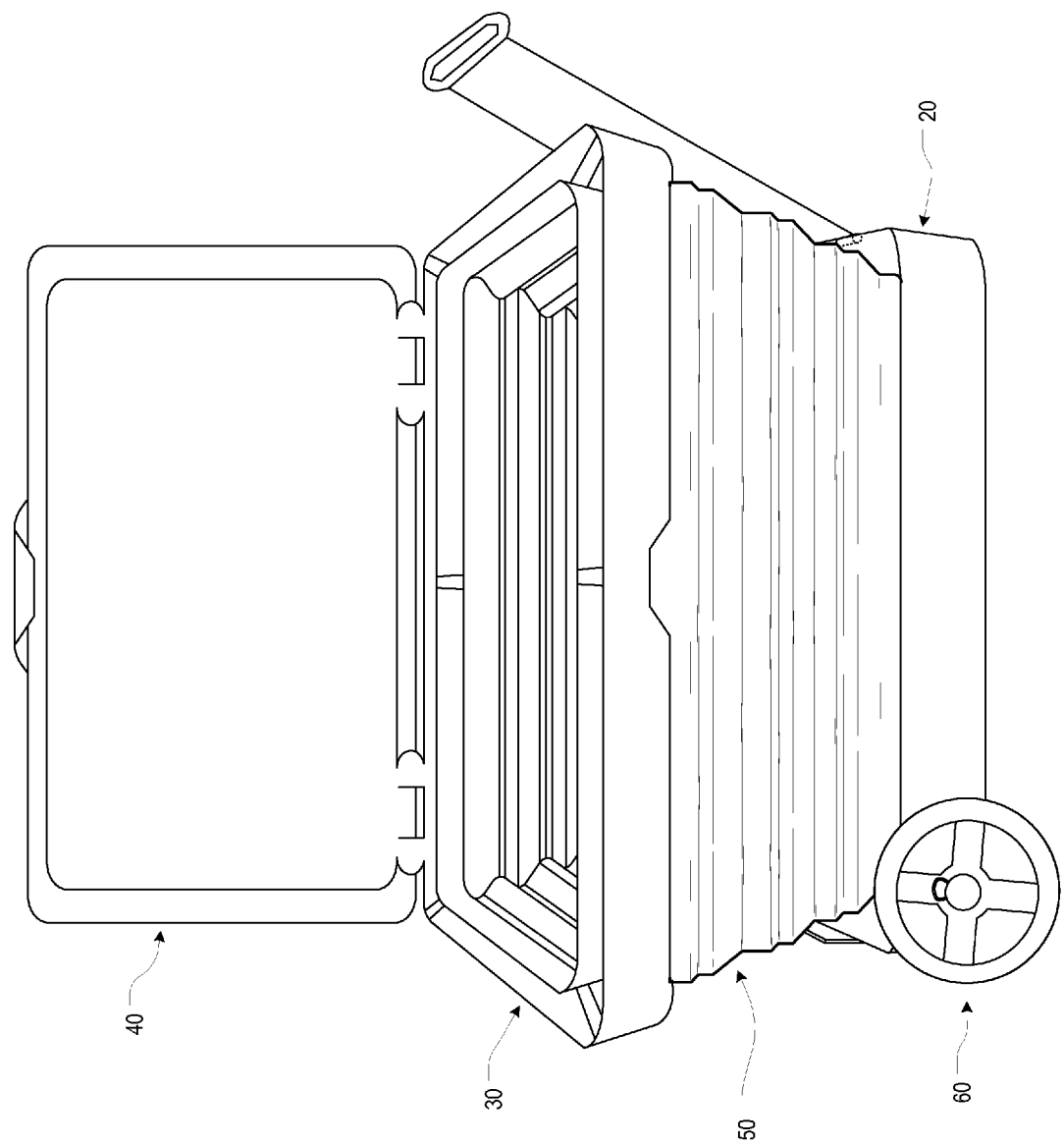
FIG. 1 is a perspective view of a preferred embodiment of a cooler having a removable wheel assembly in accordance with one or more aspects of the present invention.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

FIG. 1 is a perspective view of a preferred embodiment of a cooler 10 in accordance with one or more aspects of the present invention. The cooler 10 comprises a base 20, an upper rim 30, a lid 40, and a cooler wall 50 extending between the base 20 and the upper rim 30. The cooler further comprises a removable wheel assembly 60 attached to the base 20.

Figure 2A:
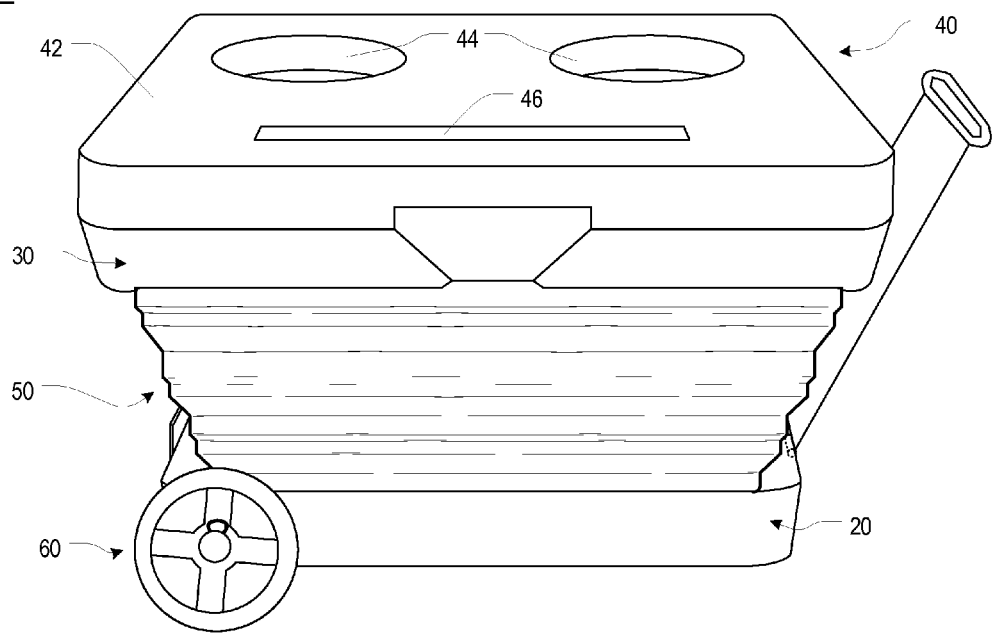
FIG. 2A is a perspective view of the cooler of FIG. 1 with the lid in a closed orientation.

FIG. 2A is a perspective view of the cooler 10 of FIG. 1 with the lid 40 in a closed orientation. The top surface 42 of the lid 40 includes a plurality of recesses including two wheel storage recesses 44 and an axle storage recess 46.

Figure 2B:
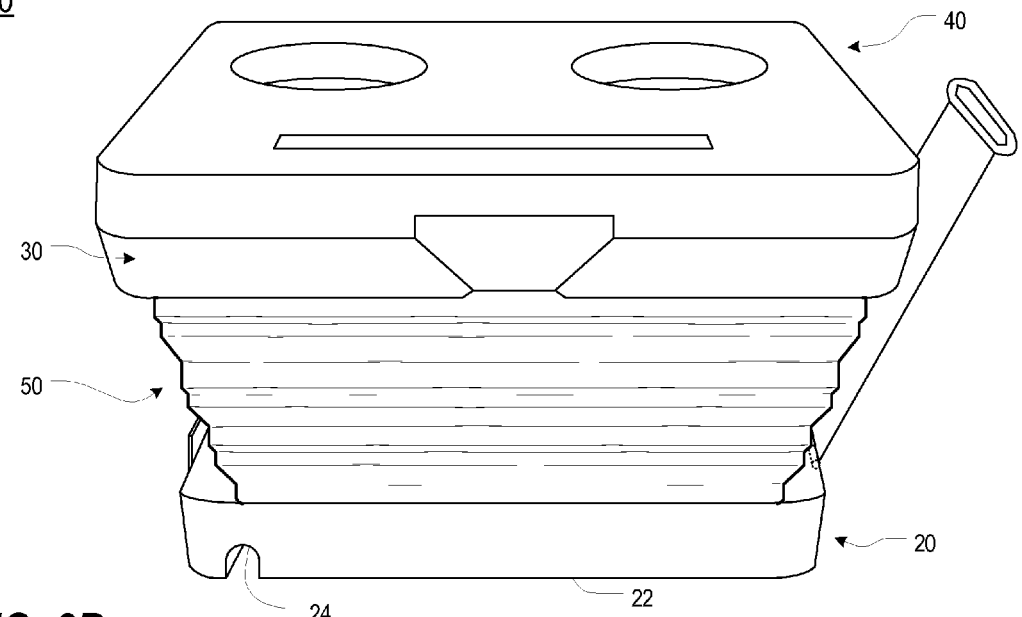
FIG. 2B is a perspective view of the cooler of FIG. 1 shown without the removable wheel assembly.

FIG. 2B is a perspective view of the cooler 10 of FIG. 1 with the removable wheel assembly 60 removed from the base 20. The base 20 has a generally rectangular perimeter and includes a bottom surface 22 having a U-shaped channel 24 adapted to receive the removable wheel assembly 60 therein.

Figure 3:
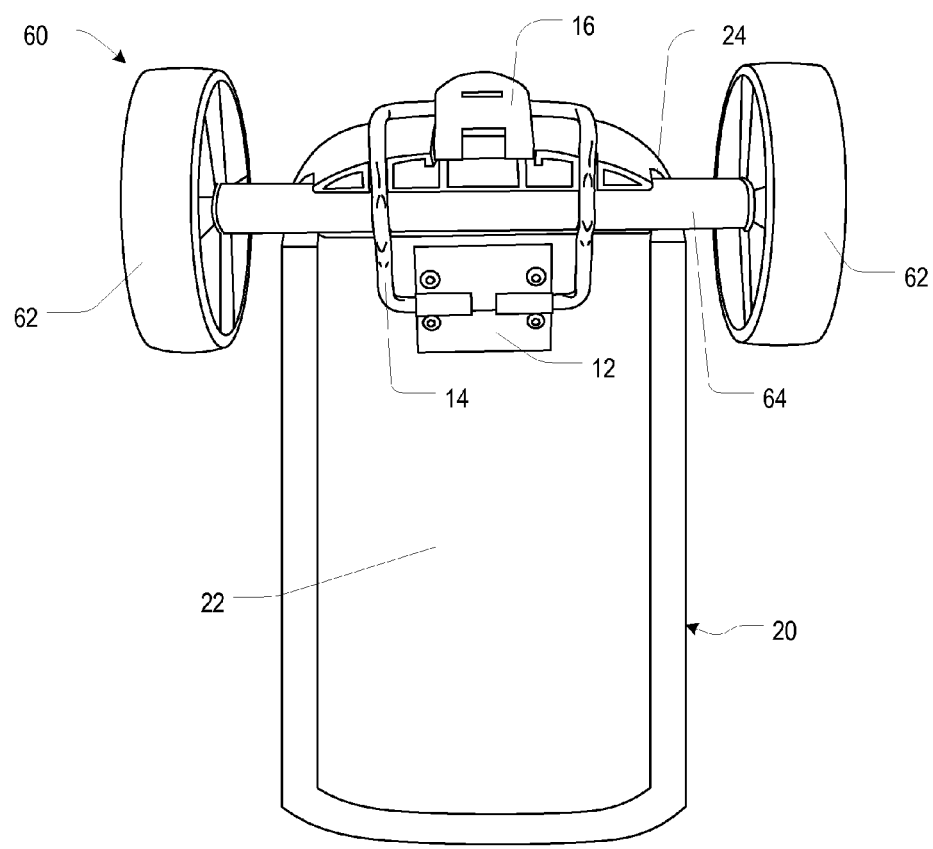
FIG. 3 is a bottom view of the cooler of FIG. 1.

FIG. 3 is a bottom view of the cooler 10 of FIG. 1 including the removable wheel assembly 60 disposed within the U-shaped channel 24. The removable wheel assembly comprises two coaxial wheels 62 and an axle 64. The removable wheels assembly 60 facilitates rolling motion of the cooler 10 from one location to another and is preferably constructed of a material capable of supporting the weight of the items stored in and on the cooler 10. It is preferred that the removable wheel assembly 60 be able to support at least about ninety pounds. It is more preferred that the removable wheel assembly 60 be able to support at least about one hundred and ten pounds.

As further seen in FIG. 3, the bottom 22 of the base 20 includes a wheel fastening system, including a mount 12 affixed to the bottom 22 of the base 20, a clip 14 hingedly connected to the mount 12, and a locking clasp 16. The clip 14, when in an open position, allows for the insertion and removal of the removable wheel assembly 60 from the U-shaped channel 24. The clip 14, when in a closed position, holds the removable wheel assembly 60 within the U-shaped channel 24. The clip 14 is locked into the closed position with the locking clasp 16.

Figure 4:
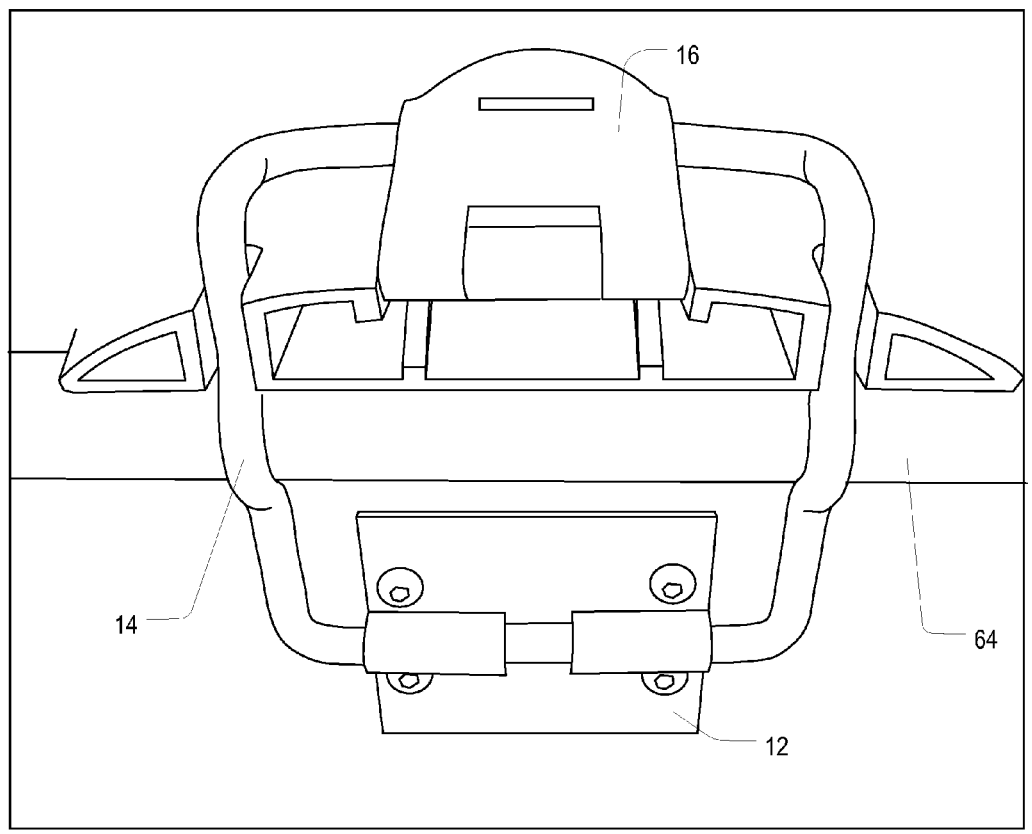
FIG. 4 is a detailed bottom view of the cooler of FIG. 1.

FIG. 4 is a detailed bottom view of the cooler 10 of FIG. 1, illustrating the wheel fastening system locked in the closed position.

Figure 5:
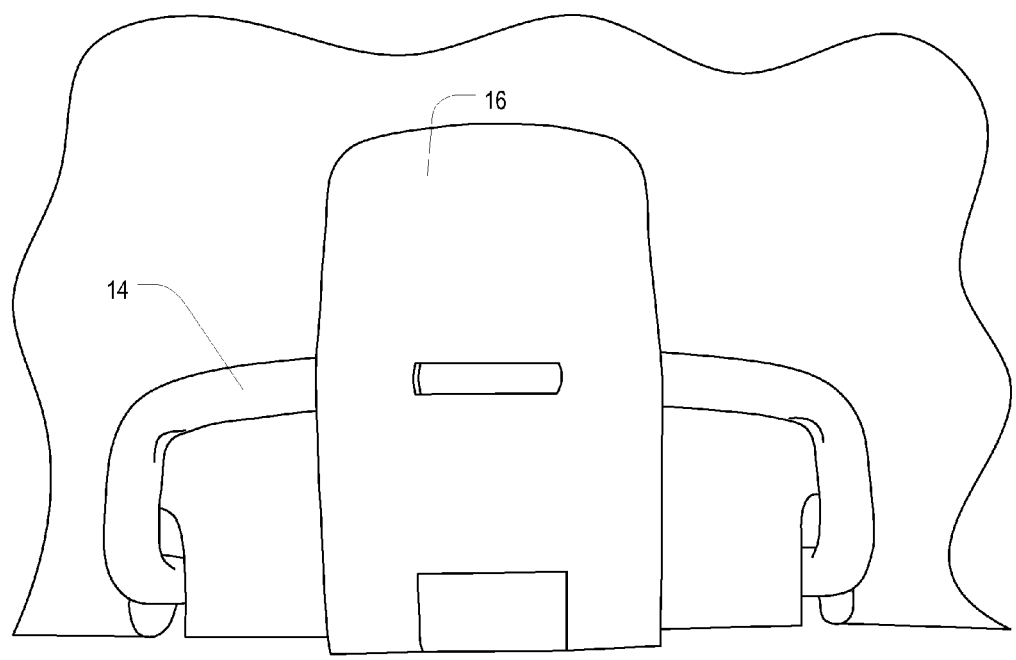
FIG. 5 is a detailed side view of the cooler of FIG. 1.

FIG. 5 is a detailed side view of the cooler 10 of FIG. 1, illustrating the wheel fastening system locked in the closed position.

Figure 6:
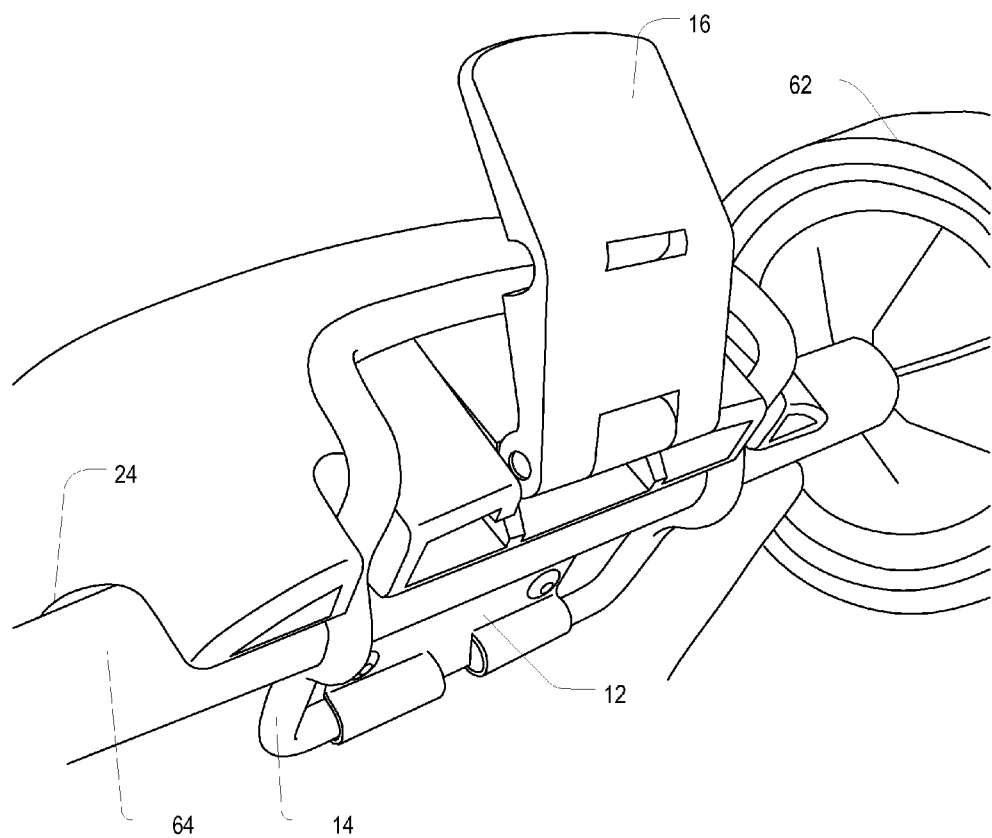
FIG. 6 is a perspective view of the cooler of FIG. 1.

FIG. 6 is a perspective view of the cooler 10 of FIG. 1, illustrating the wheel fastening system in the closed position with the locking clasp 16 disengaged from the clip 14.

Figure 7:
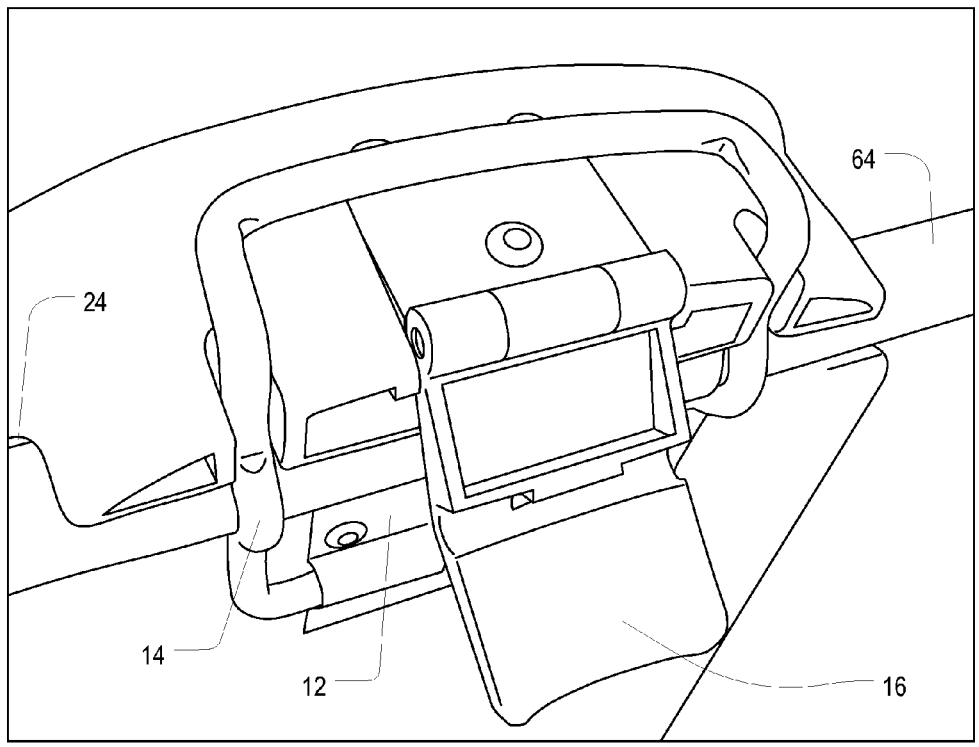
FIG. 7 is a perspective view of the cooler of FIG. 1.

FIG. 7 is a perspective view of the cooler 10 of FIG. 1, illustrating the wheel fastening system in the closed position with the locking clap 16 disengaged from the clip 14.

Figure 8:
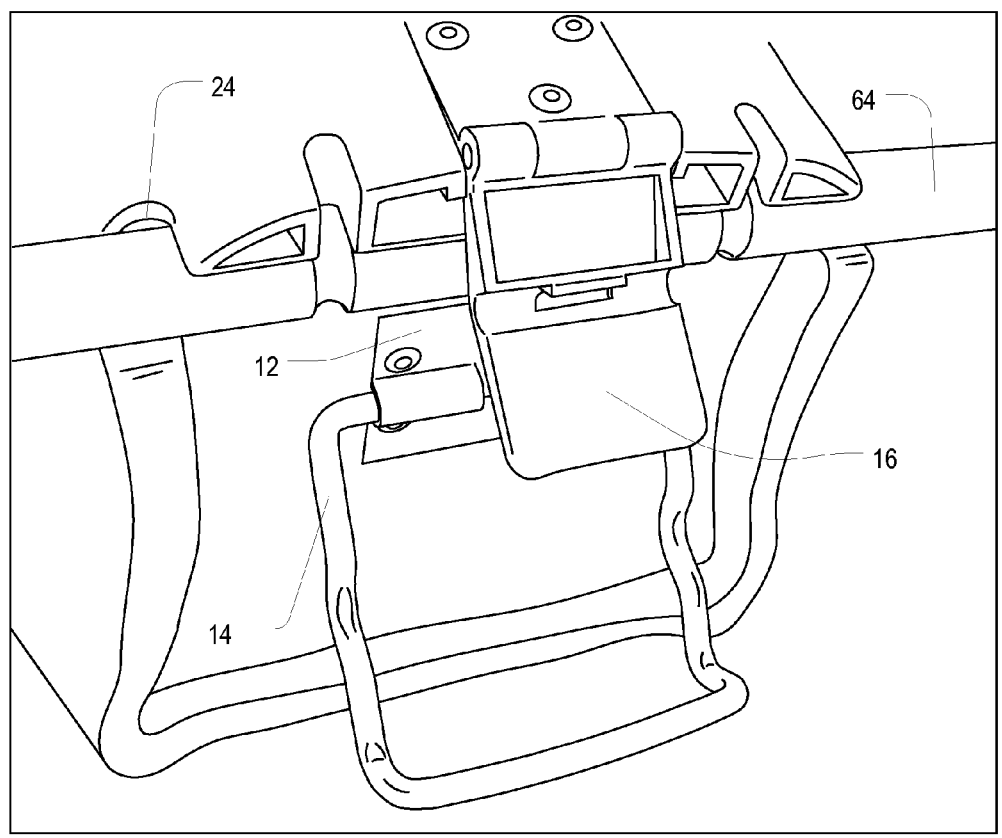
FIG. 8 is a perspective view of the cooler of FIG. 1.

FIG. 8 is a perspective view of the cooler 10 of FIG. 1, illustrating the wheel fastening system in the open position, permitting the removal of the removable wheel assembly 60 from the U-shaped channel 24.

Figure 9:
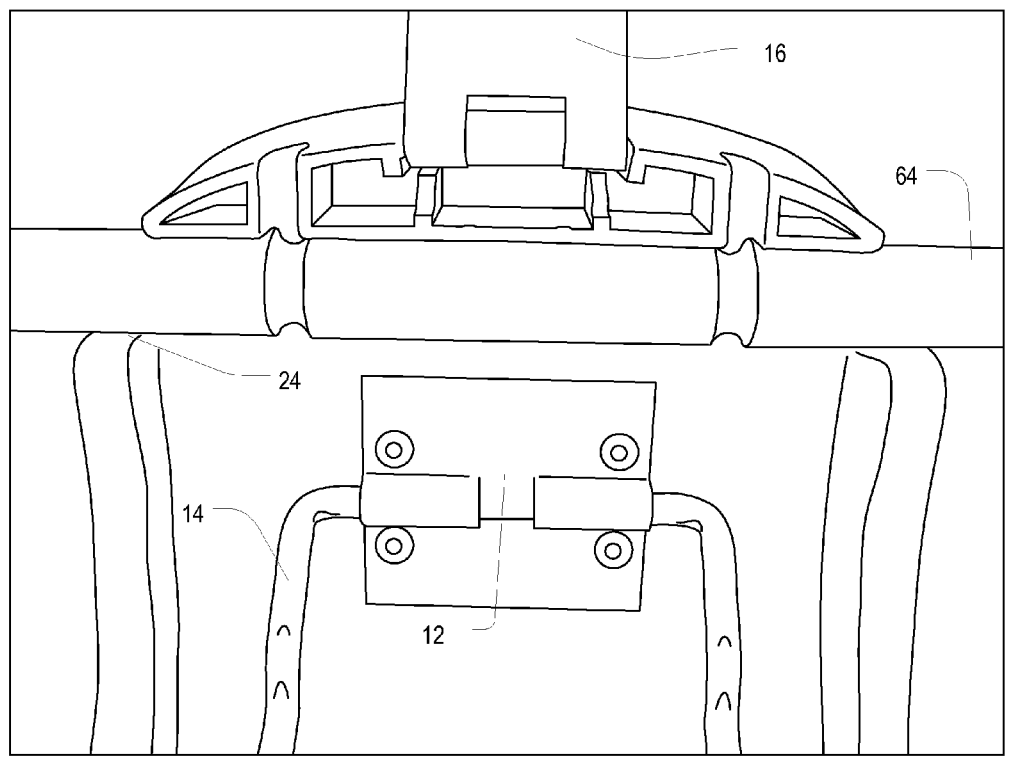
FIG. 9 is a bottom view of the cooler of FIG. 1.

FIG. 9 is a bottom view of the cooler 10 of FIG. 1, illustrating the wheel fastening system in the open position and the removable wheel assembly 60 disposed within the U-shaped channel 24.

Figure 10A:
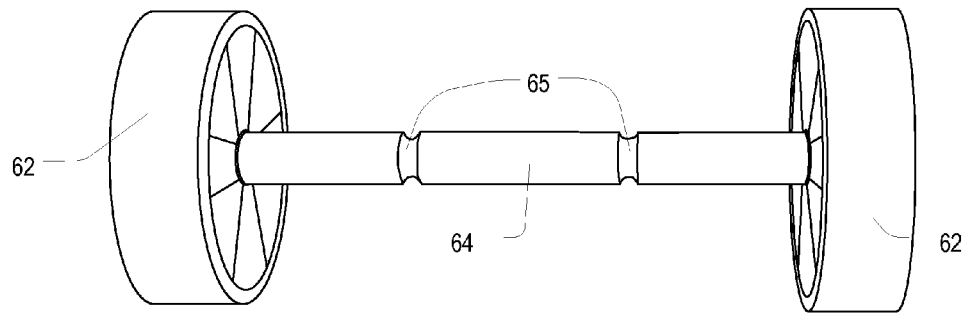
FIG. 10A is a front perspective view of the removable wheel assembly of the cooler of FIG. 1.
Figure 10B:
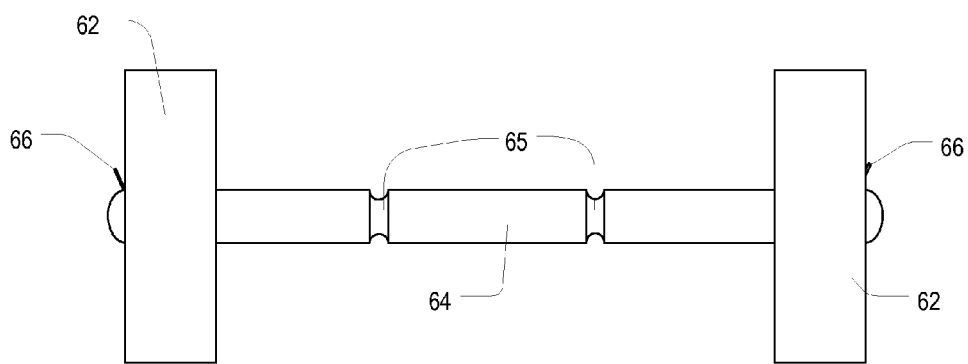
FIG. 10B is a front view of the removable wheel assembly of FIG. 10A.

FIG. 10A is a front perspective view of the removable wheel assembly 60 disengaged from the cooler 10 of FIG. 1. FIG. 10B is a front view of the removable wheel assembly 60 of FIG. 10A. The removable wheel assembly 60 includes a pair of removable wheels 62, an axle 64, and a pair of locking pins 66. The wheels 62 include a central aperture 68 adapted to receive an outer portion of the axle 64 therethrough. The axle 64 includes a central portion of a first diameter disposed between the removable wheels 62 and two outer portions each having a second diameter that is small than the first diameter. The outer portions of the axle 64 are adapted to penetrate a central aperture 68 of a wheel 62. The central portion of the axle 64 further includes two recessed portions 65 adapted to align with the clip 14 when the removable wheel assembly 60 is disposed within the U-shaped channel 24. Each outer portions of the axle 64 further includes a small opening 70 adapted for receipt of a locking pin 66. The locking pin 66 prevents the wheel 62 from sliding off the axle 64.

Figure 11A:
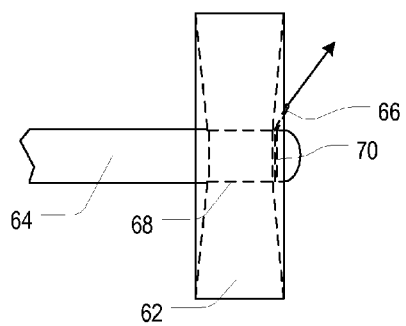
FIG. 11A is a front view of the removable wheel assembly of the cooler of FIG. 1.
Figure 11B:
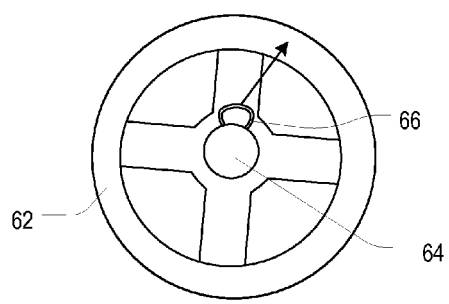
FIG. 11B is a side view of the removable wheel assembly of FIG. 11A.
Figure 11C:
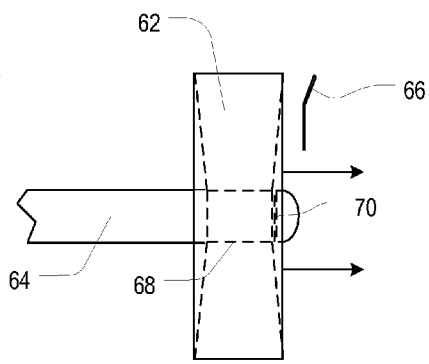
FIG. 11C is a front view of the removable wheel assembly of FIG. 11A.
Figure 11D:
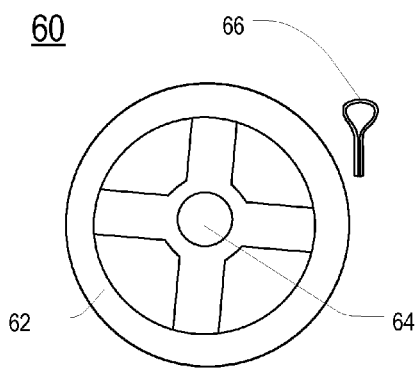
FIG. 11D is a side view of the removable wheel assembly of FIG. 11A.
Figure 11E:
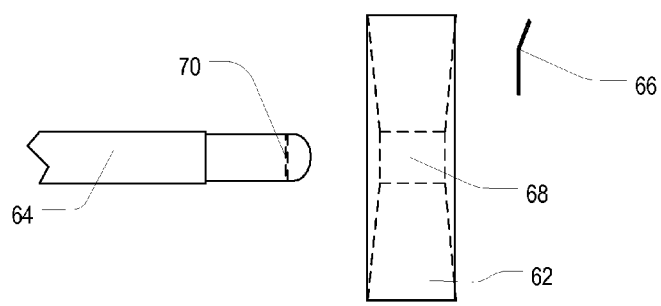
FIG. 11E is a front view of the removable wheel assembly of FIG. 11A.

FIG. 11A is a front view of a removable wheel assembly 60 of the cooler 10 of FIG. 1. FIG. 11B is a side view of the removable wheel assembly 60 of FIG. 11A. In FIGS. 11A and 11B, the wheel 62 is shown engaged with the outer portion of the axle 64, the outer portion of the axle 64 penetrating through the central aperture 68 of the wheel 62. The wheel 62 is locked in place with a locking pin 66 in the small opening 70 of the axle 64. FIG. 11C is a front view of the removable wheel assembly 60 of FIG. 11A. FIG. 11D is a side view of the removable wheel assembly 60 of FIG. 11A. In FIGS. 11C and 11D, the locking pin 66 has been removed from the small opening 70, thus permitting the wheel 62 to be slidably disengaged from the outer portion of the axle 64. FIG. 11E is a front view of the removable wheel assembly 60 of FIG. 11A, illustrating the wheel 62 removed from the outer portion of the axle 64.

Figure 12:
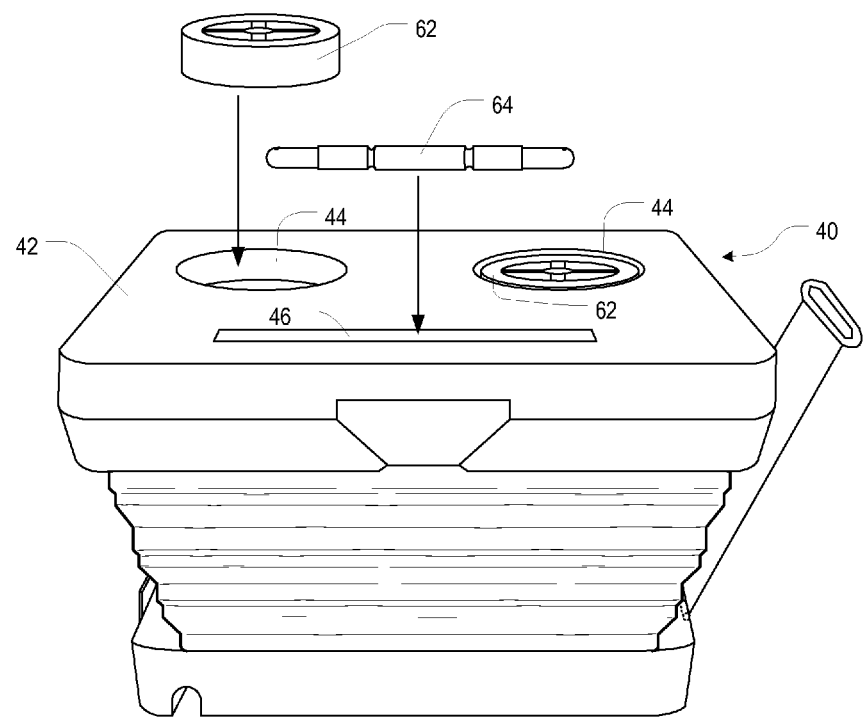
FIG. 12 is a perspective view of the cooler of FIG. 1.

FIG. 12 is a perspective view of the cooler 10 of FIG. 1 with the removable wheel assembly 60 removed from the bottom 22 of the base 20 of the cooler 10, disassembled, and stored within the plurality of recesses on the lid 40. As shown, the wheel storage recesses 44 on the lid 40 are adapted to receive and store the wheels 62, and the axle storage recess 46 on the lid 40 is adapted to receive and store the axle 64. The plurality of recesses on the lid 40 provide for convenient storage of the removable wheel assembly 60 while not in use. Although not shown in FIG. 12, it is contemplated that the locking pins 66 may be stored within either or both of the wheel storage recesses 44 or the axle storage recess 46.

FIGS. 13-17 are perspective views of a preferred embodiment of a cooler 110 with a removable wheel assembly. The cooler 110 is generally identical in structure to the cooler 10 described hereinabove with respect to FIGS. 1-12, except with respect to any changes illustrated and those changes now described.

In particular, rather than having a permanently affixed and non-retractable handle, the cooler 110 includes a telescoping handle 180 that is removable from the base 120 of the cooler 110. It will be appreciated that in one or more embodiments, a cooler in accordance with one or more aspect of the present invention may include a handle that is removable and telescoping, removable and non-telescoping, or telescoping and non-removable.

Figure 13:
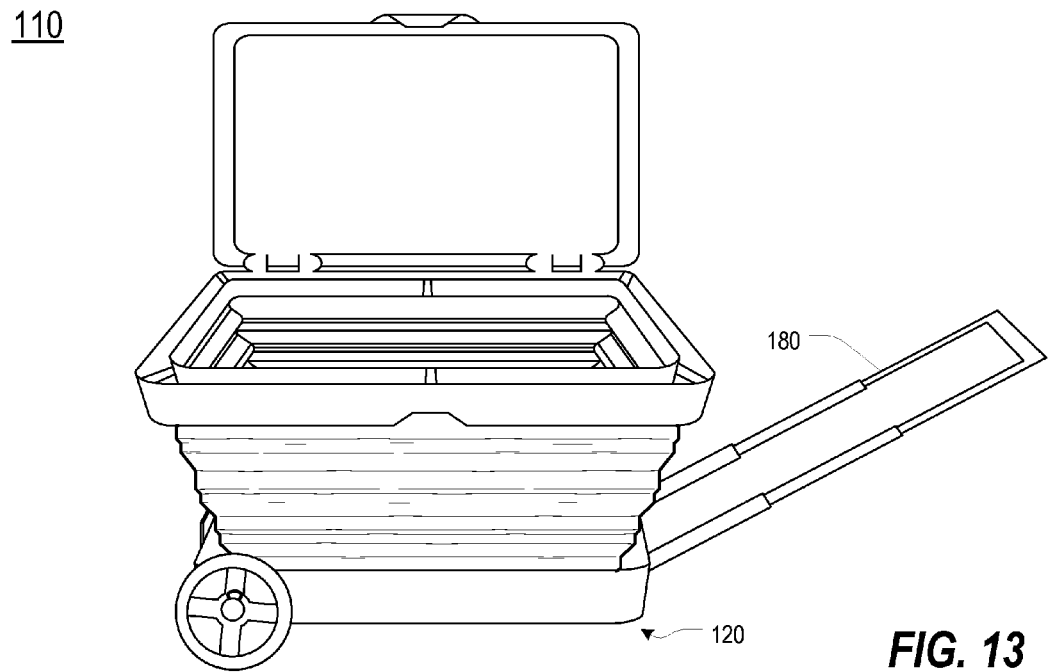
FIGS. 13-17 are perspective views of a preferred embodiment of a cooler having a removable wheel assembly and a removable telescoping handle assembly in accordance with one or more aspects of the present invention.
Figure 14:
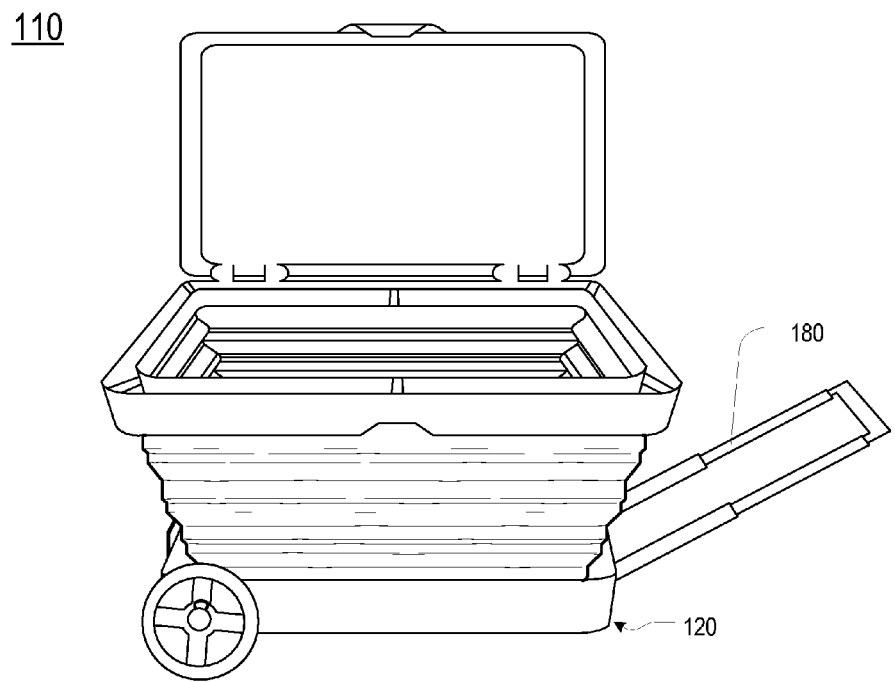
Figure 15:
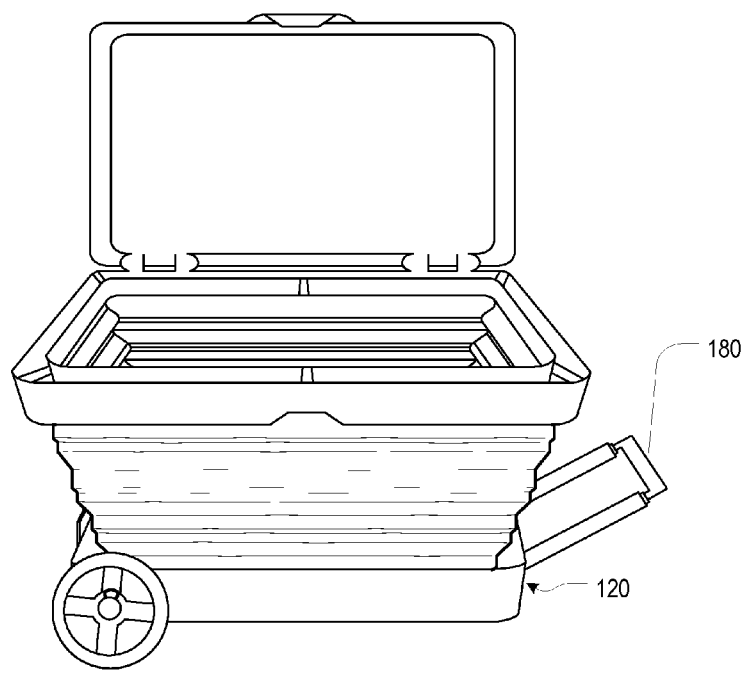
Figure 16:
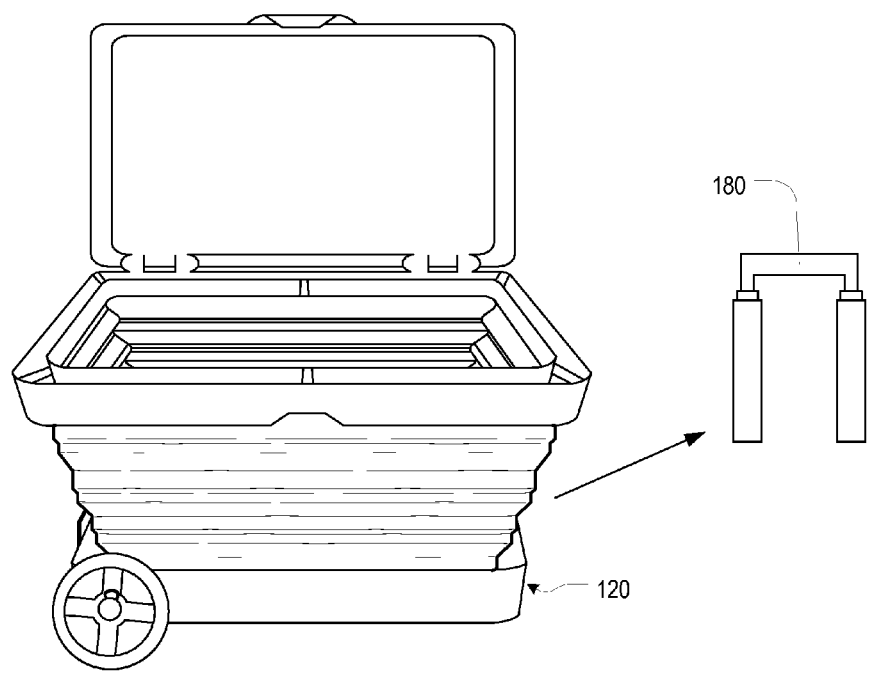

FIG. 13 illustrates the cooler 110 with the handle 180 attached to the base 120 and fully extended. FIG. 14 illustrates the cooler 110 with the handle 180 attached to the base 120 and partially retracted. FIG. 15 illustrates the cooler 110 with the handle 180 attached to the base 120 and totally retracted. FIG. 16 illustrates the cooler 110 with the handle 180 completely retracted and detached from the base 120.

Figure 17:
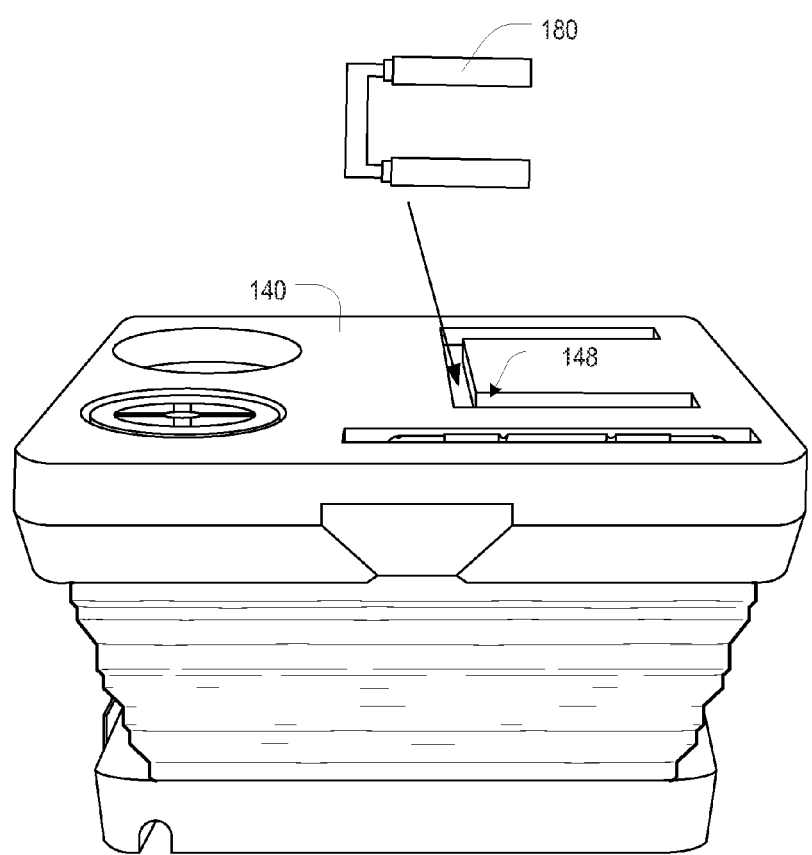

FIG. 17 is a perspective view of the cooler 110 of FIG. 13 with the removable, telescoping handle 180 removed from the base 120. Furthermore, FIG. 17 illustrates the lid 140 of the cooler 110 having a plurality of recesses for storage. The lid 140 includes a handle storage recess 148 adapted to receive and store the handle 180. The handle storage recess 148 provides for convenient storage of the handle 180 while the handle 180 is not in use.

Although one or more telescoping handles have been illustrated, other telescoping handles that may telescope to varying degrees, i.e. that may collapse down to a smaller size, are also contemplated. Further, although one or more telescoping handles are illustrated as having a general u-shape, in at least some implementations a telescoping handle includes only a single bar, that single bar being configured to telescope. Further, in at least some implementations, a handle may be configured to collapse into a main body of a cooler.

In at least some implementations, a cooler includes a drain conduit, which may comprise a drain opening and a plug, or may comprise a spigot.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A cooler, comprising:
    (a) a main body including,
        (i) a base having a footing for support of the cooler around a periphery of the base when the cooler is placed on a flat support surface,
        (ii) an upper rim, and
        (iii) one or more cooler walls extending between the upper rim and the base;
    (b) a removable wheel assembly including an axle and two wheels removably securable to the axle in coaxial position relative to one another, the main body of the cooler defining a recess
        (i) extending between front and back sides of the cooler proximate an end of the cooler, and
        (ii) sized and dimensioned to removably receive the axle therein such that the cooler is able to be rolled on the wheels when the two wheels are positioned in coaxial relation to one another on the axle and the axle is received within the recess; and
    (c) a wheel fastening system configured to secure the axle of the removable wheel assembly within the recess of the main body;
    (d) wherein, when the wheel assembly has been removed from the base, the wheel fastening system does not extend below the footing of the base so as to interfere with the support provided by the footing around the periphery of the base when the cooler is placed on a flat support surface;
    (e) wherein the one or more cooler walls extending between said base and said upper rim each comprise a tapered, flexible membrane formed of silicone rubber and including a plurality of hinge lines having less thickness than portions of the membrane extending between the hinge lines, the membrane being configured to bend at each hinge line for collapsing of the cooler.

2. The cooler of claim 1, wherein the cooler further includes a handle.

3. The cooler of claim 2, wherein the handle is removably attachable to the base.

4. The cooler of claim 3, wherein the cooler includes a lid having a handle storage recess for storage of the handle.

5. The cooler of claim 2, wherein the handle is telescoping.

6. The cooler of claim 2, wherein the handle is telescoping and removably attachable to the base.

7. The cooler of claim 1, further comprising a lid including (i) two wheel storage recesses, each being sized and dimensioned to receive and retain one of the wheels of the wheel assembly, and (ii) an axle storage recess separate from the two wheel storage recesses and sized and dimensioned to receive and retain the axle of the wheel assembly.

8. The cooler of claim 7, wherein the main body includes a front side and a back side separated by a width of the cooler, and opposite ends separated by a length of the cooler, the length being greater than the width, and wherein the axle has a length sufficient to extend the width of the cooler.

9. The cooler of claim 1, wherein the wheel fastening system comprises,
    (a) a mount located on a bottom of the cooler such that the recess is located between the mount and the end of the cooler to which the recess is proximate,
    (b) a clip hingedly connected to the mount and movable between (i) an open position in which the axle is insertable into and removable from the recess, and (ii) a closed position in which the clip extends over the axle and precludes insertion into and removal of the axle from the recess when the axle is received within the recess, and
    (c) a locking clasp located proximate the base at the end of the cooler to which the recess is proximate, the locking clasp configured to lock the clip in the closed position to secure the wheel assembly, the locking clasp extending along a side surface of the base when the locking clasp locks the clip into the closed position.

10. The cooler of claim 1, wherein the cooler further includes a handle that is hingedly connected to the base for pivoting movement relative to the base.

11. The cooler of claim 1, wherein at least one of the one or more cooler walls tapers inwardly in extending from the upper rim, and tapers inwardly in extending from the base, such that a middle section of the at least one of the one or more cooler walls has a cross-sectional perimeter that is less than a cross-sectional perimeter of the at least one of the one or more cooler walls at the base or upper rim.

12. A method of transitioning a cooler from a first configuration, in which the cooler is able to be rolled on wheels, to a second configuration, in which the cooler is not able to be rolled on wheels, comprising the steps of:
    (1) providing a cooler, comprising,
        (a) a main body comprising,
            (i) a base having a footing for support of the cooler around a periphery of the base when the cooler is placed on a flat support surface,
            (ii) an upper rim, and (iii) one or more cooler walls extending between the upper rim and the base, (b) a removable wheel assembly including an axle and two wheels removably secured to the axle in coaxial position relative to one another, the main body of the cooler defining a recess extending between front and back sides of the cooler proximate an end of the cooler, in which recess the axle is received such that the cooler is able to be rolled on the wheels, and (c) a wheel fastening system configured to secure the axle of the removable wheel assembly within the recess of the main body during rolling of the cooler, (d) wherein the one or more cooler walls extending between said base and said upper rim each comprise a tapered, flexible membrane formed of silicone rubber and including a plurality of hinge lines having less thickness than portions of the membrane extending between the hinge lines, the membrane being configured to bend at each hinge line for collapsing of the cooler, (2) removing the wheel assembly from the recess defined in the main body; and (3) configuring the wheel fastening system such that the wheel fastening system does not extend below the footing of the base so as to interfere with the support provided by the footing around the periphery of the base when the cooler is placed on a flat support surface.

13. The method of claim 12, further comprising removing the wheels from the axle and storing the wheels and the axle within recesses defined in the lid of the cooler.

14. The cooler of claim 12, wherein the cooler further includes a handle attached to the base.

* * * * *